United States Patent
Bagard et al.

(10) Patent No.: US 12,078,213 B2
(45) Date of Patent: Sep. 3, 2024

(54) TORQUE TRANSMISSION DEVICE WITH SPRINGS IN SERIES AND TORQUE TRANSMISSION SYSTEM COMPRISING SUCH A DEVICE

(71) Applicant: VALEO EMBRAYAGES, Amiens (FR)

(72) Inventors: Didier Bagard, Cergy Pontoise (FR);
Pierre Boucheny, Cergy Pontoise (FR);
David Denizot, Cergy Pontoise (FR);
Olivier Marechal, Cergy Pontoise (FR)

(73) Assignee: VALEO EMBRAYAGES, Amiens (FR)

( * ) Notice: Subject to any disclaimer, the term of this patent is extended or adjusted under 35 U.S.C. 154(b) by 529 days.

(21) Appl. No.: 17/414,139

(22) PCT Filed: Dec. 19, 2019

(86) PCT No.: PCT/EP2019/086172
§ 371 (c)(1),
(2) Date: Jun. 15, 2021

(87) PCT Pub. No.: WO2020/127639
PCT Pub. Date: Jun. 25, 2020

(65) Prior Publication Data
US 2022/0065305 A1    Mar. 3, 2022

(30) Foreign Application Priority Data

Dec. 20, 2018    (FR) ........................................ 1873595
Jan. 28, 2019    (FR) ........................................ 1900747

(51) Int. Cl.
*F16F 15/123*    (2006.01)
*F16D 3/12*    (2006.01)

(52) U.S. Cl.
CPC .......... *F16D 3/12* (2013.01); *F16F 15/12333* (2013.01); *F16F 15/12346* (2013.01)

(58) Field of Classification Search
CPC .. F16D 3/12; F16F 15/12333; F16F 15/12346
(Continued)

(56) References Cited

U.S. PATENT DOCUMENTS 5,984,065 A * 11/1999 Teramae ................. F16H 45/02
    192/205
6,047,804 A    4/2000 Feldhaus et al.
(Continued)

FOREIGN PATENT DOCUMENTS

CN    103671698 A    3/2014
CN    105905285 A    8/2016
(Continued)

OTHER PUBLICATIONS

Combined Chinese Office Action and Search Report issued May 10, 2022 in Chinese Patent Application No. 201980084614.3 (with English translation of office action only), 8 pages.
(Continued)

*Primary Examiner* — Greg Binda
(74) *Attorney, Agent, or Firm* — Oblon, McClelland, Maier & Neustadt, L.L.P.

(57) ABSTRACT

A torque transmission device includes a first element, a second element, and a third element which are able to rotate about an axis of rotation; a first spring which is arranged between the first element and the third element; a second spring which is arranged between the second element and the third element; a first supporting seat positioned at a first end of the first spring; and a second supporting seat positioned at a first end of the second spring. The third element includes a torque transfer element directly transferring torque between the first spring and the second spring.

19 Claims, 7 Drawing Sheets

(58) Field of Classification Search
USPC ...................... 464/64.1, 68.92; 192/205, 213
See application file for complete search history.

(56) References Cited

U.S. PATENT DOCUMENTS

| | | |
|---|---|---|
| 2017/0122402 A1 | 5/2017 | Murata et al. |
| 2017/0184178 A1 | 6/2017 | Murata |
| 2018/0163814 A1 | 6/2018 | Sekine et al. |

FOREIGN PATENT DOCUMENTS

| | | |
|---|---|---|
| CN | 106382330 A | 2/2017 |
| CN | 106468323 A | 3/2017 |
| CN | 107023587 A | 8/2017 |
| DE | 10 2012 215 829 A1 | 4/2013 |
| DE | 10 2014 220 901 A1 | 4/2016 |
| DE | 10 2017 201 913 A1 | 8/2018 |
| EP | 3 026 294 A2 | 6/2016 |
| EP | 3 336 380 A1 | 6/2018 |
| JP | 2016-98954 A | 5/2016 |
| JP | 2017-187142 A | 10/2017 |
| WO | WO 2014/034941 A1 | 3/2014 |

OTHER PUBLICATIONS

International Search Report issued on Feb. 21, 2020 in PCT/EP2019/086172 filed on Dec. 19, 2019, 2 pages.

\* cited by examiner

TORQUE TRANSMISSION DEVICE WITH SPRINGS IN SERIES AND TORQUE TRANSMISSION SYSTEM COMPRISING SUCH A DEVICE

The present invention relates to a torque transmission device for a motor vehicle.

Torque transmission devices of the LTD (Long Travel Damper) type are known. These devices comprise several pairs of springs, the elastic members of the one same pair being arranged in series via a phasing member so that the elastic members of each pair deform in phase with one another.

Such torque transmission devices without supporting seats are known. Document DE102016203042 discloses a device of this type. That device has the disadvantage of suffering a great deal of wear at the supports for the ends of the springs, because of friction at the input and output interfaces of each spring pair.

Fitting supporting seats at the ends of each spring is also known from EP 3 026 294. That device has the disadvantage of taking up a great deal of circumferential space for the seats, at the expense of the springs which therefore have to be shortened. That torque transmission device therefore has a greater stiffness, and its damping performance is not as good.

SUMMARY

The objective of the invention is therefore to provide a torque transmission device with high-performance damping while avoiding the phenomena of wear at the ends of the springs.

To this end, the invention relates to a torque transmission device comprising:
- a first element which is able to rotate about an axis of rotation (X);
- a second element which is able to rotate about the axis of rotation (X);
- a third element which is able to rotate about the axis of rotation (X);
- a first spring which is arranged between the first element and the third element so as to be compressed elastically upon relative rotation between the first element and the third element,
- a second spring which is arranged between the second element and the third element so as to be compressed elastically upon relative rotation between the second element and the third element, the first spring and the second spring being arranged in series between the first element and the second element by way of the torque transfer element of the third element,
- a first supporting seat positioned at a first end of the first spring, on the one hand between the first element and the first spring so as to transfer torque between the first element and the first spring in a first direction of relative rotation of the first element and second element, and, on the other hand, between the second element and the first spring so as to transfer torque between the second element and the first spring in a second direction of relative rotation of the first element and second element,
- a second supporting seat positioned at a first end of the second spring, on the one hand between the second element and the second spring so as to transfer torque between the second element and the second spring in the first direction of relative rotation of the first element and second element, and, on the other hand, between the first element and the second spring so as to transfer torque between the first element and the second spring in the second direction of relative rotation of the first element and second element;

the torque transmission device being characterized in that the third element comprises a torque transfer element directly transferring torque between the first spring and the second spring.

In other words, the torque transmission device has no supporting seat attached, on the one hand, between the torque transfer element of the third element and the first spring and, on the other hand, between the torque transfer element of the third element and the second spring.

The torque transfer element is in direct contact with the first spring and with the second spring.

Thus, this solution makes it possible to obtain quality damping, while at the same time limiting the wearing of the springs. On the one hand, the friction and dynamic hysteresis between the springs and the first and second elements are limited. On the other hand, the angular travel is not limited by the presence of a seat at each end of a spring.

The torque transmission device may also comprise the following additional features, alone or in combination:

The first spring and the second spring are helical springs made of steel.

The first spring and the second spring are arranged on the one same radius. In other words, they are positioned in series in a circumferential direction.

The torque transfer element is made of metal, for example of steel. Thus, the supporting interface creates less wear than when springs made of steel collaborate with seats made of plastic. In addition, because of the use of a torque transfer element made of metal, notably of steel, the strength of the material allows the circumferential dimension of the torque transfer element to be reduced and allows this space-saving to be used to increase the size of the springs and therefore the quality of the damper.

The first spring and the second spring are positioned in an open space of the torque transmission device. In other words, the first spring and the second spring are positioned in a space that is not fluidtight, and devoid of grease.

According to one embodiment, the first seat and the second seat have no pivot. Therefore they do not pivot radially.

The torque transmission device comprises a plurality of first springs and a plurality of second springs which are organized in spring pairs.

The third element is a phasing element comprising a plurality of torque transfer elements, each torque transfer element being interposed between the first spring and the second spring of a spring pair, the first spring and the second spring of each spring pair being arranged in series by way of a torque transfer element.

The phasing member comprises at least one phase washer provided with an annular portion extending around the axis of rotation X.

The torque transmission device comprises a plurality of first supporting seats each positioned at a first end of a first spring.

The torque transmission device comprises a plurality of second supporting seats each positioned at a first end of a second spring.

Each phase washer is formed from steel sheet.

The annular portion of the phase washer develops radially.

Each annular portion extends about the axis of rotation radially on the inside of the first and second springs. In this way, the radial bulk is reduced.

Of the first element and the second element one bears a friction disk and of the first element and the second element the other comprises a hub capable of driving a gearbox input shaft.

According to one embodiment, the first element comprises a plate extending about the axis of rotation and the second element comprises two lateral washers arranged one on each side of the plate.

The torque transfer element is situated axially between the lateral washers.

The third element comprises two phase washers axially offset from one another.

Where appropriate, the two phase washers are arranged axially on the inside of the two lateral washers of the second element.

Where appropriate, the two phase washers are arranged axially one on each side of the plate.

The two phase washers are spaced axially away from one another.

Where appropriate, the friction disk is mounted on the plate so that it rotates as one with same, for example using rivets.

The torque transfer element bears circumferentially against a second end of the first spring and also bears circumferentially against a second end of the second spring.

The torque transfer element projects radially from the annular portion of the phase washer.

The torque transfer element comprises a first centering device positioned in the second end of the first spring.

The torque transfer element comprises a second centering device positioned in the second end of the second spring. Thus, the centering devices orient the axial positioning of the springs, preferably in a plane perpendicular to the axis of rotation X.

There is an axial clearance between the first centering device and the first spring and there is an axial clearance between the second centering device and the second spring, each axial clearance being less than 1 mm, particularly less than 0.5 mm. As a preference, each axial clearance is greater than 0.1 mm.

The first and second seats are produced in plastic, for example in polyamide or PAEK, for example in polyamide 6-6 or PEEK.

The first and second seats may be fiber reinforced, for example glass-fiber reinforced or carbon-fiber reinforced. For example, the seats may contain between 20 wt % and 50 wt % of fibers, for example 30 wt % of glass fibers.

According to another embodiment, the first and second seats comprise a metal insert around which the plastic is overmolded.

According to another embodiment, the first and second seats are made of metal.

The first seat and the second seat have a cap respectively radially covering the first end of the first spring and the first end of the second spring. Thus, the seats guide the springs radially.

The first seat and the second seat comprise axial-guidance ribs able to collaborate with the first element and with the second element.

The caps of the first seat and of the second seat each have axial-guidance ribs able to collaborate with the first element and with the second element.

The first seat comprises a first bearing surface against which a first end face of the first spring bears.

In a plane perpendicular to the axis of rotation X and in a neutral state of torque, there is a first angular clearance $\theta 1$ separating the first end face of the first spring and the first bearing surface of the first seat, this angular clearance being comprised between 1 and 15°, notably between 3 and 10°.

The second seat comprises a second bearing surface against which a first end face of the second spring bears.

In a plane perpendicular to the axis of rotation X and in the neutral state of torque, there is a second angular clearance $\Theta 2$ separating the first end face of the second spring and the second bearing surface of the second seat, this angular clearance being comprised between 1 and 15°, notably between 3 and 10°.

The torque transfer element comprises a third bearing surface against which a second end face of the first spring bears.

In a plane perpendicular to the axis of rotation X and in the neutral state of torque, there is a third angular clearance $\theta 3$ separating the second end face of the first spring and the third bearing surface of the torque transfer element, this angular clearance being comprised between 1 and 15°, notably between 3 and 10°.

The torque transfer element comprises a fourth bearing surface against which a second end face of the second spring bears.

In a plane perpendicular to the axis of rotation X and in the neutral state of torque, there is a fourth angular clearance $\theta 4$ separating the second end face of the second spring and the fourth bearing surface of the torque transfer element, this angular clearance being comprised between 1 and 15°, notably between 3 and 10°.

Thus, when the angular clearances $\theta 1$, $\theta 2$, $\theta 3$, and $\theta 4$ are comprised, in the neutral state of torque, between 3 and 10°, notably between 5° and 8°, the attack angular offset of the springs is spread over each of the ends of the first and second springs, allowing the friction involved at the spring ends to be distributed over each spring end as the attack angular clearance is taken up. Of course the invention is not restricted to these angular clearance values, it also being possible for one of these clearances to be nil, in another embodiment.

The first and second bearing surfaces are annular bearing surfaces, the first end face of the first spring and the first end face of the second spring being formed respectively by a first end turn of the first spring and a first end turn of the second spring each of which respectively rests on the first bearing surface and on the second bearing surface. Thus, the end turn of the springs rests entirely against the seat, thereby limiting the wearing of the springs.

The annular bearing surfaces develop in a plane parallel to the axis of rotation X.

The torque transfer element comprises a first upper lug and a second upper lug projecting circumferentially in two circumferentially opposite directions, the first upper lug radially covering the second end of the first spring, and the second upper lug covering the second end of the second spring.

The torque transmission device comprises a third spring which is housed inside the first spring.

The torque transmission device comprises a fourth spring which is housed inside the second spring.

The torque transmission device comprises a first shock absorber positioned inside the first spring and able elastically to oppose the relative rotation between the first element and the third element beyond a predetermined first angular travel between the first element and the third element in a first direction of relative rotation.

The torque transmission device comprises a second shock absorber positioned inside the second spring and able elastically to oppose the relative rotation between the second element and the third element beyond a predetermined second angular travel between the second element and the third element in the first direction of relative rotation.

Each shock absorber is in the form of a column.

Each shock absorber is made of thermoplastic, for example of co-polyester, for example formed from a material such as hytrel®.

If appropriate, the first seat is designed to press against the third spring. If appropriate, the second seat is designed to press against the fourth spring.

If appropriate, the first absorber is positioned in the third spring.

If appropriate, the second absorber is positioned in the fourth spring.

The first spring and/or the second spring are mounted with a preload such that their length is reduced by less than 2 mm, preferably less than 1 mm, with respect to their free length.

The first and second seats thus each comprise a centering stud for centering the first and second springs.

Each phase washer comprises a tab extending radially from the annular portion and arranged circumferentially between the first spring and the second spring.

Each torque transfer element is formed by an insert mounted on at least one of the phase washer tabs.

Each insert is made of steel, preferably sintered or cast steel.

Each insert is clamped axially between a tab of one phase washer and a tab of another phase washer.

The insert is assembled with the two tabs of phase washer between which it is fitted, by means of a fastener such as a rivet.

Each insert is positioned between two phase washers assembled with each other.

Fasteners are positioned in the torque transfer elements for assembling the phase washers with one another.

The insert has a flat body positioned perpendicular to the axis X. The first spring and the second spring bear against two circumferentially opposite edge faces of the body of the insert. These two edge faces form the third bearing surface and the fourth bearing surface. The thickness (E) of this body is less than the axial width (L) of the first and second springs.

As a preference, the axial thickness (E) of the body is such that E<0.6 L, preferably E<0.4 L, L being the axial width of the springs. Thus, notably because of the material chosen for the insert, the latter is not very bulky in the axial direction.

The insert has a boss on each of its two opposite faces. The two bosses of the insert are each pressed firmly against a phase washer tab. Each phase washer tab is holed, and the insert is likewise holed in the region of the bosses in order to accommodate a fastener which secures the two phase washers and the insert to one another. For example, this fastener is a rivet. Thus, the phasing member is created in a very simple way. The phasing member is both low in bulk and simple to produce because of the simple geometry of the elements of which it is composed, namely two sheet-metal phase washers, an insert, and fasteners such as rivets.

The insert is arranged on the same plane as the first element. If appropriate, the insert is arranged on the same plane perpendicular to the axis of rotation as the plate.

A covering portion of the first element radially covers the insert, a radial clearance separating the covering portion of the first element and at least a portion of the insert, for example the lug(s). Thus there is very little radial space wasted.

Each phase washer comprises a tab extending radially from the annular portion and arranged circumferentially between the first spring and the second spring.

The phase washer comprises a tab extending radially from the annular portion and arranged circumferentially between the first spring and the second spring, the torque transfer element being formed by said tab.

The tab is thus a torque transfer tab.

The third element comprises, for each spring pair, two torque transfer elements transferring the torque directly between the first spring and the second spring of a same spring pair.

The third element comprises two phase washers and the two torque transfer elements of a spring pair are formed respectively on two tabs formed respectively on each of the two phase washers; the two tabs being arranged axially facing one another.

The first and second springs bear against the circumferentially opposite edge faces of the tabs of the phase washers.

Circumferentially between the first spring and the second spring of a spring pair, at least one spacer connects the two tabs that form the two torque transfer elements.

According to an embodiment which has not been depicted, between the first spring and the second spring of a spring pair, two spacers connect the two tabs that form the two torque transfer elements. For example, the spacers are flat spacers. For example, one of the two spacers is oriented parallel to the second end face of the first spring and the other of the two spacers is oriented parallel to the second end face of the second spring.

The spacers are crimped into the tabs 37 of phase washers 31, 32.

The phase washer tabs are stamped. Each tab comprises an oriented relief directed in an opposite direction to the other phase washer, the spacer being mounted on this relief.

The first seat bears against the first and second elements via a first dorsal bearing surface. The second seat bears against the first and second elements via a second dorsal bearing surface.

Each tab is more or less inscribed within a plane perpendicular to the axis of rotation X.

Another subject of the invention is a torque transmission system comprising a torque transmission device and a torque limiter configured to squeeze the friction disk of the torque transmission device.

The invention also relates to a torque transmission device comprising:
  a first element which is able to rotate about an axis of rotation (X);
  a second element which is able to rotate about the axis of rotation (X);
  a first spring which is arranged in the torque transmission path between the first element and the second element;
  a first supporting seat positioned at a first end of the first spring, on the one hand between the first element and the first spring so as to transfer torque between the first element and the first spring in a first direction (S1) of relative rotation of the first element and second element, and, on the other hand, between the second element and the first spring so as to transfer torque between the second element and the first spring in a second direction (S2) of relative rotation of the first element and second element, the torque transmission device being characterized in that the first seat has a cap radially covering the first end of the first spring and the cap of the first seat has axial-guidance ribs able to collaborate with the first element and with the second element.

This solution may include one or more of the above-mentioned features, notably:

The torque transmission device comprises a third element which is able to rotate about the axis of rotation (X); the first spring being arranged between the first element and the third element in such a way as to be compressed elastically upon relative rotation between the first element and the third element, and the torque transmission device further comprising a second spring which is arranged between the second element and the third element so as to be compressed elastically upon relative rotation between the second element and the third element, the first spring and the second spring being arranged in series between the first element and the second element by way of the third element.

The torque transmission device comprises a second supporting seat positioned at a first end of the second spring, on the one hand between the second element and the second spring so as to transfer torque between the second element and the second spring in the first direction (S1) of relative rotation of the first element and second element, and, on the other hand, between the first element and the second spring so as to transfer torque between the first element and the second spring in the second direction (S2) of relative rotation of the first element and second element.

The second seat has a cap radially covering the first end of the second spring and the cap of the second seat has axial-guidance ribs able to collaborate with the first element and with the second element.

According to one embodiment, the first element comprises a plate extending about the axis of rotation and the second element comprises two lateral washers arranged one on each side of the plate, the cap of the first seat and of the second seat each comprising two ribs, one positioned axially between the plate and one of the lateral washers and the other positioned axially between the plate and the other of the lateral washers.

According to one embodiment, the ribs extend circumferentially on the radially external face of each cap.

According to another embodiment, in a plane perpendicular to the axis of rotation X and in the neutral state of torque, there is a first angular clearance $\theta 1$ separating the first end face of the first spring and the first bearing surface of the first seat, a second angular clearance $\theta 2$ separating the first end face of the second spring and the second bearing surface of the second seat, a third angular clearance $\theta 3$ separating the second end face of the first spring and the third bearing surface of the torque transfer element, and a fourth angular clearance $\theta 4$ separating the second end face of the second spring and the fourth bearing surface of the torque transfer element, the first angular clearance $\theta 1$, the second angular clearance $\theta 2$, the third angular clearance $\theta 3$ and the fourth angular clearance $\theta 4$ being such that, when the first and second elements are in the relative position of rest: $\theta 3>2\times\theta 1$ and $\theta 4>2\times\theta 2$, with the third angular clearance $\theta 3$ and the fourth angular clearance $\theta 4$ each being greater than 3 degrees, preferably greater than 5 degrees, preferably greater than 8 degrees.

According to one embodiment, the first angular clearance $\theta 1$, the second angular clearance $\theta 2$, the third angular clearance $\theta 3$ and the fourth angular clearance $\theta 4$ are such that, when the first and second elements are in the relative position of rest: $\theta 3>4\times\theta 1$ and $\theta 4>4\times\theta 2$ and preferably such that $\theta 3>10\times\theta 1$ and $\theta 4>10\times\theta 2$. Thus, wear is even further limited.

According to one embodiment, when the first element, the second element and the third element are in the relative position of rest, the first angular clearance $\theta 1$ and the second angular clearance $\theta 2$ are less than 1°.

According to one embodiment, when the first element, the second element and the third element are in the relative position of rest, the first angular clearance $\theta 1$ and the second angular clearance $\theta 2$ are nil.

The invention also relates to a torque transmission device comprising:
  a first element which is able to rotate about an axis of rotation X;
  a second element which is able to rotate about the axis of rotation X;
  a third element which is able to rotate about the axis of rotation X;
  a first spring which is compressed between the second element and the third element in a first direction of relative rotation of the first element and second element and which is compressed between the first element and the third element in a second direction of relative rotation of the first element and second element which is the opposite to the first direction of relative rotation,
  the first spring having, when the damper is in the position of rest, a first end face on the one hand bearing directly or indirectly against a first contact surface associated with the first element and, on the other hand, bearing directly or indirectly against a fifth contact surface associated with the second element, the first spring also having a second end face bearing directly or indirectly against a third contact surface associated with the third element,
  a second spring which is compressed between the third element and the first element in the first direction of relative rotation of the first element and second element and which is compressed between the third element and the second element in the second direction of relative rotation of the first element and second element,
  the second spring having a first end face on the one hand bearing directly or indirectly against a second contact surface associated with the first element and, on the other hand, bearing directly or indirectly against a sixth contact surface associated with the second element, the second spring also having a second end face bearing directly or indirectly against a fourth contact surface associated with the third element, the first spring and the second spring being arranged in series between the first element and the second element by way of the third element,
  the second contact surface, the third contact surface, the fourth contact surface, the fifth contact surface respectively having a second bearing plane, a third bearing plane, a fourth bearing plane, and a fifth bearing plane against which the first end face of the second spring, the second end face of the first spring, the second end face of the second spring, the first end face of the first spring are respectively pressed in the relative position representing the end of angular travel of the first and second elements in the first direction of relative rotation;
  the torque transmission device being characterized in that:
  in a plane perpendicular to the axis of rotation X and in the relative position of rest of the first and second elements, there is a first angular clearance $\theta 1$ separating the first end face of the first spring and the fifth bearing plane, a second angular clearance θ2 separating the first end face of the second spring and the second bearing plane, a third angular clearance θ3 separating the second end face of the first spring and the third bearing plane, and a fourth angular clearance θ4 separating the second end face of the second spring and the fourth bearing plane, the first angular clearance θ1, the second angular clearance θ2, the third angular clearance θ3 and the fourth angular clearance 84 are such that, when the first and second elements are in the relative position of rest: θ3>2×θ1 and θ4>2×θ2, with the third angular clearance θ3 and the fourth angular clearance θ4 each being greater than 3 degrees, preferably greater than 5 degrees, preferably greater than 8 degrees.

In other words, the attack angular clearance of the springs is concentrated at the bearing interfaces with the third element. The sign × here means the multiplication symbol. Beyond an angular clearance θ3 and, respectively, θ4, that is more than twice the angular clearance θ1 and, respectively, θ2, the attack clearance of the springs is concentrated on the third element so that the wearing at the spring bearing interfaces is limited.

Each angular clearance therefore corresponds, when the first, second and third elements are in the position of rest, in a plane perpendicular to the axis X, and when there is no intermediate component such as a seat or a spring cup, to the angle separating the plane occupied by the corresponding end face of the spring and the plane occupied by the corresponding bearing plane (when the first and second elements are in the position of rest), and, when there is an intermediate component such as a seat or a spring cup, to the sum of the angle separating the plane occupied by the corresponding end face of the spring and the frontal face of the intermediate component, and of the angle of pivoting of the intermediate component between the position of rest and the relative position representing the end of travel for which position the intermediate component is in contact with the corresponding bearing plane.

This torque transmission device may also comprise the following additional features, alone or in combination:

The first contact surface, and the sixth contact surface, the fourth contact surface and the fifth contact surface respectively have a first bearing plane, and a sixth bearing plane against which the first end face of the first spring, and the first end face of the second spring are respectively pressed in the relative position representing the end of angular travel of the first and second elements in the second direction of relative rotation; a fifth angular clearance θ5 separating the first end face of the first spring and the first bearing plane, and a sixth angular clearance θ6 separating the first end face of the second spring and the sixth bearing plane; θ1 and θ6 being such that, when the first and second elements are in the relative position of rest: θ3>2×θ5 and θ4>2×θ6, with the third angular clearance θ3 and the fourth angular clearance θ4 each being greater than 3 degrees, preferably greater than 5 degrees, preferably greater than 8 degrees.

The first angular clearance θ1, the second angular clearance θ2, the third angular clearance θ3 and the fourth angular clearance θ4 are such that, when the first and second elements are in the relative position of rest: θ3>4×θ1 and θ4>4×θ2 and preferably such that θ3>10×θ1 and θ4>10×θ2. Thus, wear is even further limited.

When the first element, the second element and the third element are in the relative position of rest, the first angular clearance θ1 and the second angular clearance θ2 are less than 1°.

When the first element, the second element and the third element are in the relative position of rest, the first angular clearance θ1 and the second angular clearance θ2 are nil.

When the first element, the second element and the third element are in the relative position of rest, the first end face of the first spring is pressed against the first bearing plane and the first end face of the second spring is pressed against the second bearing plane.

Whatever the angular travel between the first element and the second element, the first angular clearance θ1 and the second angular clearance θ2 are nil.

Whatever the angular travel between the first element and the second element, the first end face of the first spring is pressed against the first bearing plane and the first end face of the second spring is pressed against the second bearing plane.

The second end face of the first spring bears against the third contact surface via a radially internal portion of the first spring when the first element, the second element and the third element are in the relative position of rest.

The second end face of the second spring is kept bearing against the fourth contact surface via a radially internal portion when the first element, the second element and the third element are in the relative position of rest.

The first end face of the first spring bears against a frontal face of a first supporting seat and the first end face of the second spring bears against a frontal face of a second supporting seat.

The first supporting seat is positioned, on the one hand, between the second element and the first spring so as to transfer torque between the second element and the first spring in a first direction of relative rotation of the first element and second element, and, on the other hand, between the first element and the first spring so as to transfer torque between the first element and the first spring in a second direction of relative rotation of the first element and second element.

The second supporting seat is positioned at a first end of the second spring, on the one hand between the first element and the second spring so as to transfer torque between the first element and the second spring in the first direction of relative rotation of the first element and second element, and, on the other hand, between the second element and the second spring so as to transfer torque between the second element and the second spring in the second direction of relative rotation of the first element and second element.

The torque transmission device comprises a plurality of first springs and a plurality of second springs organized in spring pairs, the third element being a phasing member comprising a plurality of torque transfer elements, each torque transfer element being interposed between the first spring and the second spring of a spring pair, the first spring and the second spring of each spring pair being arranged in series by way of a torque transfer element, and the phasing member comprising at least one phase washer provided with an annular portion extending about the axis of rotation X.

Each torque transfer element transfers the torque directly between the first spring and the second spring without an intermediate component such as a seat.

The second end face of the first spring bears against a frontal face of a third supporting seat and the second end of the second spring bears against a frontal face of a fourth supporting seat, the third supporting seat and the fourth supporting seat each being mounted with the ability to pivot on the third element with an angle of pivoting between the position of rest and the relative position representing the end of the travel, the third angular clearance and the fourth angular clearance being embodied respectively by the angle of pivoting of the third seat and the angle of pivoting of the fourth seat.

The first spring and/or the second spring are mounted with a preload such that their length is reduced by less than mm, preferably less than mm, with respect to their free length.

According to one embodiment, $\theta 1=\theta 2$ when the first and second elements are in the relative position of rest.

According to one embodiment, $\theta 5=\theta 6$ when the first and second elements are in the relative position of rest.

According to one embodiment, $\theta 3=\theta 4$ when the first and second elements are in the relative position of rest.

According to one embodiment, the sum of the angular clearances on the first spring is substantially equal to the sum of the angular clearances on the second spring, so that $\theta 1+\theta 3=\theta 4+\theta 2$ and/or $\theta 5+\theta 3=\theta 4+\theta 6$.

According to another embodiment, notably if one of either the first spring or the second spring generates an angular travel that is greater than the other one of either the first spring or the second spring, then the sum of the angular clearances on the spring that offers the greatest angular travel is greater than the sum of the angular clearances on the spring that offers the smaller angular travel. This is notably the case when an end stop is employed between the third element and one of either the first element or the second element.

According to one embodiment, for $\alpha$=maximum angular travel between the first element and the second element, $0.4\alpha \leq \theta 1+\theta 2+\theta 3+\theta 4 \leq \alpha$, and preferably, $0.5\alpha \leq \theta 1+\theta 2+\theta 3+\theta 4 \leq \alpha$.

Of the first element and the second element one bears a friction disk and of the first element and the second element the other comprises a hub capable of driving a gearbox input shaft.

According to one embodiment, the first element comprises a plate extending around the axis of rotation and the second element comprises two lateral washers arranged one on each side of the plate, the third element comprising two phase washers axially offset from one another, the two phase washers being arranged axially on the inside of the two lateral washers of the second element, and the two phase washers being arranged axially one on each side of the plate.

Another subject of the invention is a torque transmission system comprising a torque transmission device as claimed in the preceding claim and a torque transmission mechanism able to squeeze the friction disk, such as a clutch mechanism or a torque limiter.

BRIEF DESCRIPTION OF THE FIGURES

The invention will be better understood, and other aims, details, features and advantages thereof will become clearer, from the following description of a plurality of particular embodiments of the invention, provided solely by way of nonlimiting illustration, with reference to the attached drawings.

DESCRIPTION OF EMBODIMENTS

In the description and the claims, the terms "outer" and "inner" and also the orientations "axial" and "radial" will be used to designate elements of the torque transmission device according to the definitions given in the description. By convention, the "radial" orientation is directed orthogonally to the axis of rotation X of the elements of the torque transmission device determining the "axial" orientation and, from the inside to the outside away from said axis, the "circumferential" orientation is directed orthogonally to the axial direction and orthogonally to the radial direction. The terms "external" and "internal" are used to define the relative position of one element with respect to another, with reference to the axis of rotation X, an element close to the axis thus being described as internal as opposed to an external element situated radially at the periphery.

Figure 1:
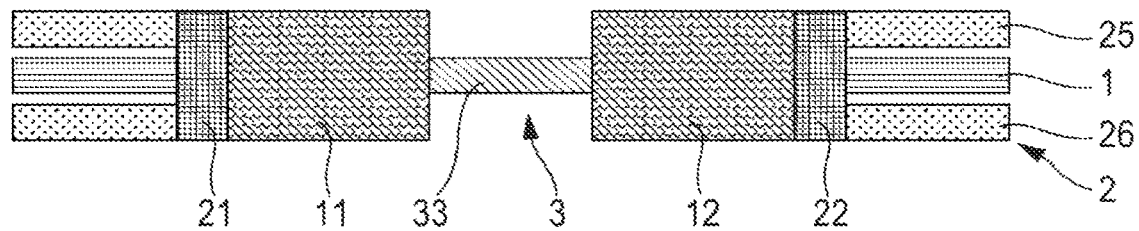
FIG. 1, FIG. 2, and FIG. 3 are schematic depictions of a transmission of torque between a first element, a second element, and a third element with a first spring and a second spring which are interleaved, at various stages of transmission.
Figure 2:
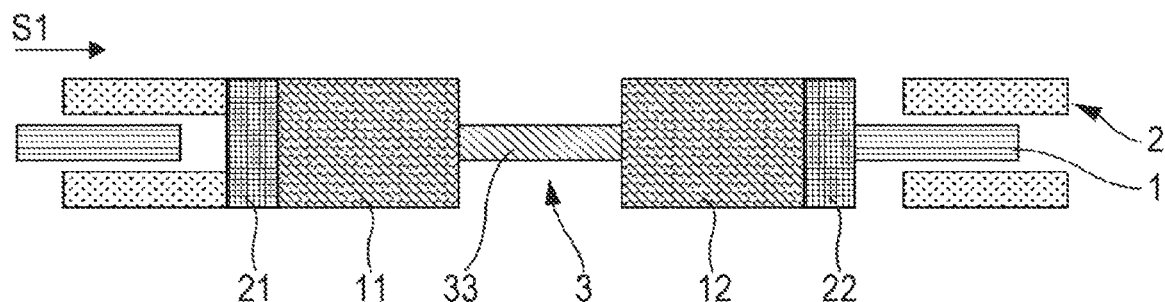
Figure 3:
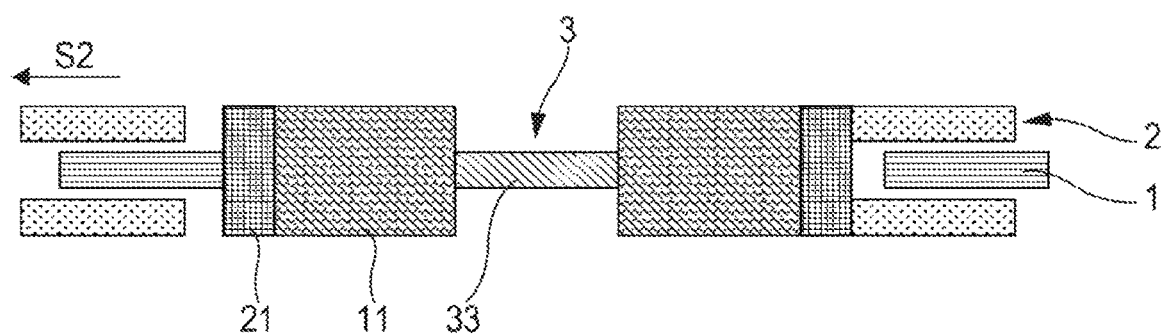

FIGS. 1 to 3 show schematic diagrams illustrating the operation of a torque transmission device comprising a first spring 11 and a second spring 12 which are arranged in series between a first element 1 and a second element 2 by way of a third element 3.

The torque transmission device comprises:
- a first element 1 which is able to rotate about an axis of rotation X;
- a second element 2 which is able to rotate about the axis of rotation X;
- a third element 3 which is able to rotate about the axis of rotation X;
- a first spring 11 which is arranged between the first element 1 and the third element 3 so as to be compressed elastically upon relative rotation between the first element 1 and the third element 3,
- a second spring 12 which is arranged between the second element 2 and the third element 3 so as to be compressed elastically upon relative rotation between the second element 2 and the third element 3, the first spring 11 and the second spring 12 being arranged in series between the first element 1 and the second element 2 by way of the torque transfer element 33 of the third element 3,
- a first supporting seat 21 positioned at a first end of the first spring 11, on the one hand between the first element 1 and the first spring 11 so as to transfer torque between the first element 1 and the first spring 11 in a first direction S1 of relative rotation of the first element 1 and second element 2, and, on the other hand, between the second element 2 and the first spring 11 so as to transfer torque between the second element 2 and the first spring 11 in a second direction S2 of relative rotation of the first element 1 and second element 2,
- a second supporting seat 22 positioned at a first end of the second spring 12, on the one hand between the second element 2 and the second spring 12 so as to transfer torque between the second element 2 and the second spring 12 in the first direction S1 of relative rotation of the first element 1 and second element 2, and, on the other hand, between the first element 1 and the second spring 12 so as to transfer torque between the first element 1 and the second spring 12 in the second direction S2 of relative rotation of the first element 1 and second element 2.

In FIG. 1 the torque transmission device is at rest, namely at zero speed and nil torque or neutral torque.

In FIG. 2, the torque transmission device is transferring torque from the second element 2 to the first element 1 in a relative direction S1. The first spring 11 and the second spring 12 are compressed between the first element 1 and the second element 2. A space separates the first spring 11 from the first element 1 and another space separates the second spring 12 from the second element 2.

In FIG. 3, the torque transmission device is transferring torque from the first element to the second element in a relative direction S2, the opposite of S1. The first spring 11 and the second spring 12 are compressed between the first element 1 and the second element 2. A space separates the first spring 11 from the second element 2 and another space separates the second spring 12 from the first element. 1.

These figures schematically show that the third element comprises a torque transfer element 33 directly transferring torque between the first spring 11 and the second spring 12. In other words, the torque transmission device has no supporting seat attached, on the one hand, between the torque transfer element of the third element and the first spring and, on the other hand, between the torque transfer element of the third element and the second spring.

The first spring and the second spring are helical springs made of steel and the torque transfer element is made of metal, for example of steel.

Because the torque transfer element 33 is directly in contact with the first spring 11 and with the second spring 12, this solution makes it possible to obtain quality damping while at the same time limiting the wearing of the springs thanks to the metal/metal contact interface at the torque transfer element. Specifically, this bearing interface creates less wear than when springs made of steel collaborate with seats made of plastic. Thus, the friction and dynamic hysteresis between the springs and the first and second elements are limited thanks to the presence of the seats and, on the other hand, the angular travel is not limited by the presence of a seat at each end of a spring.

In addition, because of the use of a torque transfer element made of metal, notably of steel, the strength of the material allows the circumferential dimension of the torque transfer element to be reduced and allows this space-saving to be used to increase the size of the springs and therefore the quality of the damper.

FIGS. 1 to 3 schematically depict only a single pair of springs, but the torque transmission device will generally comprise a plurality of first springs 11 and a plurality of second springs 12 organized into spring pairs.

In this instance, the third element 3 may be a phasing element comprising a plurality of torque transfer elements 33, each torque transfer element being interposed between the first spring and the second spring of a spring pair, the first spring 11 and the second spring 12 of each spring pair being arranged in series by way of a torque transfer element 33.

A first embodiment is illustrated in FIGS. 4 to 7.

The first element 1 bears a friction disk 18, and the second element comprises a hub 29 capable of driving a gearbox input shaft. In this embodiment, the first element comprises a plate 1 extending about the axis of rotation X and the second element 2 comprises two lateral washers 25 and 26 arranged one on each side of the plate 1. The hub 29 is secured to the lateral washers 25, 26 by a plurality of rivets, for example six rivets. The friction disk 18 is mounted on the plate 1 so that it rotates as one with same, for example using rivets. The friction disk carries the friction linings, not referenced. Two pairs of first 11 and second 12 springs transmit torque between the plate 1 and the lateral washers 25 and 26.

The friction disk is intended to be squeezed by a clutch device such as a clutch mechanism or torque limiter 83.

In order to limit the angular travel between the first element 1 and the second element, an angular end stop 90 is arranged between the hub 29 and the plate 1 using teeth, formed on the hub 29, and each sliding circumferentially between two end walls of a cutout formed on the interior outline of the plate 1.

The torque transmission device comprises a friction device 80 made up of a plurality of washers. At least one friction washer and at least one elastic spring washer apply axial load toward the friction washer to generate friction between the first element 1 and the second element 2 upon relative rotation between the first element and the second element. In this instance this is a conditional-operation friction device comprising an operation washer 81 provided with an operation tab 82 positioned between the second spring 12 and the first element 1. This conditional-operation friction device is able to generate friction in only one direction of transmission, for example in the retro direction.

According to another embodiment which has not been depicted, the second element could comprise a plate 1 able to drive a transmission hub intended to be coupled to a gearbox shaft, and the first element 1 could comprise two lateral washers 25 and 26 arranged one on each side of the plate 1, it being possible for one of these lateral washers to bear the friction disk.

Figure 4:
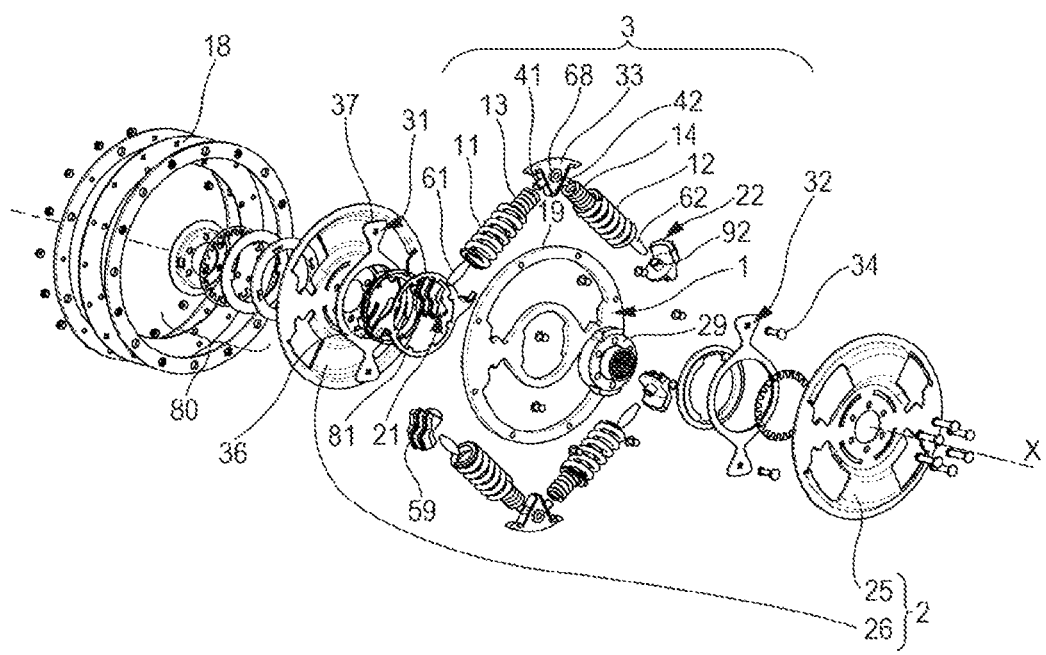
FIG. 4 is an exploded view of a first embodiment.
Figure 5:
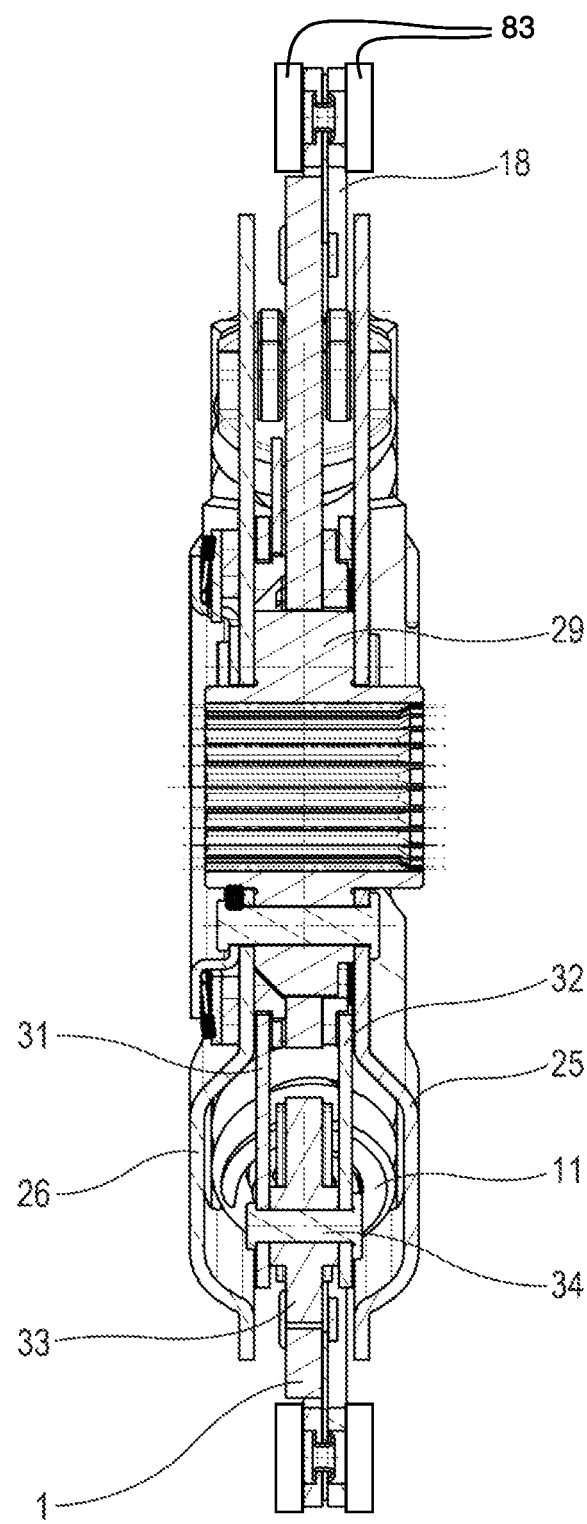
FIG. 5 is a view in section on a plane containing the axis of rotation of the first embodiment.

As can be seen in FIG. 4, the phasing member 3 comprises two spaced-apart phase washers 31 and 32 axially offset from one another. The two phase washers 31 and 32 are arranged axially on the inside of the two lateral washers 25 and 26 of the second element 2. The two phase washers 31 and 32 are also arranged axially one on each side of the plate.

Each phase washer 31, 32 is provided with an annular portion 36 extending about the axis of rotation X. The annular portion 36 of the phase washer develops radially. Each phase washer may be formed from steel sheet.

Each annular portion 36 extends about the axis of rotation radially on the inside of the first 11 and second 12 springs. In this way, the radial bulk is reduced.

The torque transmission device comprises a plurality of first supporting seats 21 each positioned at a first end of a first spring 11 and a plurality of second supporting seats 21 each positioned at a first end of a second spring 12.

The torque transfer element 33 bears circumferentially against a second end of the first spring 11 and also bears circumferentially against a second end of the second spring 12. It develops radially from the annular portions 36 of the phase washers 31, 32.

Each phase washer 31, 32 comprises a tab 37 extending radially from the annular portion and arranged circumferentially between the first spring 11 and the second spring 12. Each torque transfer element 33 is formed, in the first embodiment, by an insert 33 mounted between two tabs 37 each belonging to a distinct phase washer. Each insert 33 is held axially between these two tabs 37 and assembled with the two tabs 37 by means of a rivet 34. The phase washers are therefore assembled with one another by way of the rivets 34.

Each insert 33 has a flat body positioned perpendicular to the axis X. As a preference, the axial thickness E of the body is such that E<0.6 L, preferably E<0.4 L, L being the axial width of the springs. Thus, notably because of the material chosen for the insert, the latter is not very bulky in the axial direction.

Each insert 33 has, on each of its two opposite faces, a boss 68 projecting axially from the body. The two bosses 68 of the insert are each pressed firmly against a tab 37 of a phase washer 31, 32. Each tab 37 of a phase washer 31, 32 is holed, and the insert 33 is likewise holed in the region of the bosses 68 in order to accommodate a fastener 34 which secures the two phase washers 31 and 32 and the insert 33 to one another. Thus, the phasing member is created in a very simple way.

Each insert is made of steel, preferably sintered or cast steel.

Figure 6:
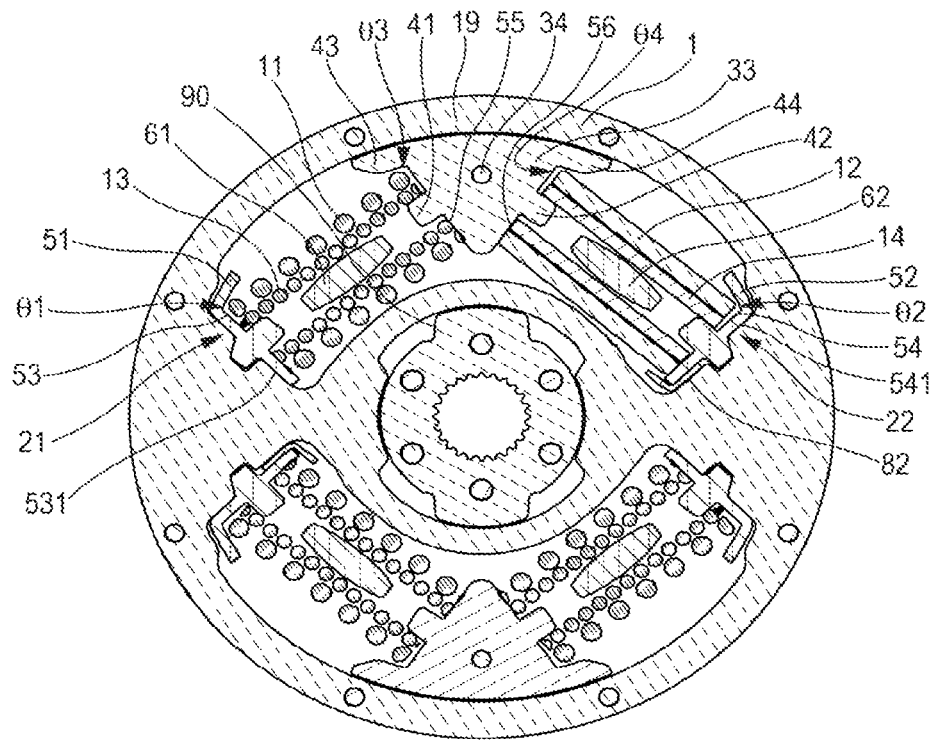
FIG. 6 is a view in section on a plane perpendicular to the axis of rotation of the first embodiment.
Figure 7:
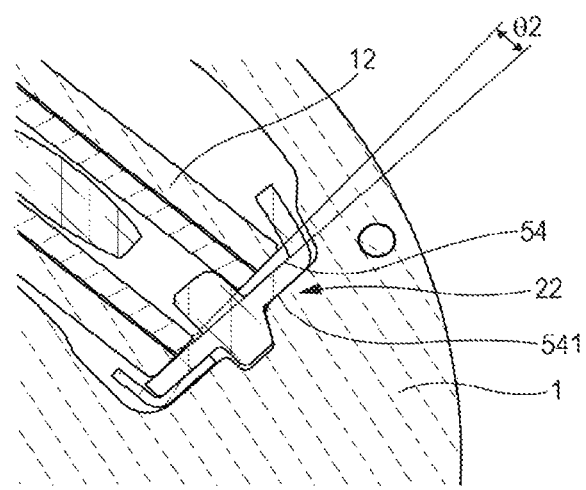
FIG. 7 is a view of a detail of the first embodiment.

As can be seen in the section view in FIG. 6, the insert 33 is arranged on the same plane perpendicular to the axis of rotation X as the plate.

A covering portion 19 of the plate 1 radially covers the insert 33 and the insert 33 has a radially upper edge face which, in a plane perpendicular to the axis of rotation X, has the shape of an arc of a circle centered on the axis of rotation X. The covering portion 19 of the plate 1 has a circular shape complementing that of the upper edge face of the insert 33, there being a clearance separating the covering portion 19 of the plate 1 and the upper edge face of the insert 33.

The insert 33 comprises a first centering device 41 positioned in the second end of the first spring 11 and a second centering device 42 positioned in the second end of the second spring 12. There is an axial clearance between the first centering device 41 and the first spring 11 and between the second centering device 42 and the second spring 12, each axial clearance being less than 1 mm, particularly less than 0.5 mm. As a preference, each axial clearance is greater than 0.1 mm.

Each insert 33 also comprises two lugs radially retaining the second end of the first spring 11 and of the second spring 12.

The lugs and the centering devices are formed in the body of the insert, or in other words do not extend axially beyond the body.

The first and second seats 21, 22 are produced in plastic, for example in polyamide or PAEK, for example in polyamide 6-6 or PEEK. The first and second seats 21, 22 may be fiber reinforced, for example glass-fiber reinforced or carbon-fiber reinforced. For example, the seats may contain between 20 wt % and 50 wt % of fibers, for example 30 wt % of glass fibers.

The first seat 21 and the second seat 22 have a cap 51 respectively radially covering the first end of the first spring 11 and the first end of the second spring 12, the caps of the first seat 21 and of the second seat 22 each having axial-guidance ribs able to collaborate with the plate 1 and with the lateral washers 25 and 26.

With reference to FIG. 4, it may be seen that the first seat 21 comprises a first bearing surface 53 against which a first end face of the first spring 11 bears. In a plane perpendicular to the axis of rotation X and in a neutral state of torque, there is a first angular clearance θ1 separating the first end face of the first spring and the first bearing surface 53 of the first seat 21, this angular clearance being comprised between 1 and 15°, notably between 3 and 10°.

The second seat 22 comprises a second bearing surface 54 against which a first end face of the second spring 12 bears. In a plane perpendicular to the axis of rotation X and in the neutral state of torque, there is a second angular clearance θ2 separating the first end face of the second spring and the second bearing surface 54 of the second seat 22, this angular clearance being comprised between 1 and 15°, notably between 3 and 10° (see FIG. 7).

The insert 33 comprises a third bearing surface 55 against which a second end face of the first spring 11 bears. In a plane perpendicular to the axis of rotation X and in the neutral state of torque, there is a third angular clearance θ3 separating the second end face of the first spring and the third bearing surface 55 of the insert, this angular clearance being comprised between 1 and 15°, notably between 3 and 10°.

The insert comprises a fourth bearing surface 56 against which a second end face of the second spring 12 bears. In a plane perpendicular to the axis of rotation X and in the neutral state of torque, there is a fourth angular clearance θ4 separating the second end face of the second spring and the fourth bearing surface 56 of the insert, this angular clearance being comprised between 1 and 15°, notably between 3 and 10°.

The two circumferentially opposite edge faces of the insert 33 form the third bearing surface and the fourth bearing surface. The thickness E of this body is less than the axial width L occupied by the first and second springs.

FIG. 6 shows a view of the two spring pairs in a plane perpendicular to the axis (X) passing through the plate 1 and the phasing member. One of the second springs 12 has been illustrated in the form of a tube in order better to show the attack angular clearance at this spring.

It may be seen that the angular attack of the first and second springs 11 and 12 is distributed over the four ends of each spring pair. Thus, when the angular clearances θ1, θ2, θ3, and θ4 are comprised, in the neutral state of torque, between 3 and 10°, notably between 5° and 8°, the attack angular offset of the springs is spread over each of the ends of the first and second springs.

The first and second bearing surfaces 53 and 54 are annular bearing surfaces, the first end face of the first spring and the first end face of the second spring being formed respectively by a first end turn of the first spring 11 and a first end turn of the second spring 12 each of which respectively rests on the first bearing surface 53 and on the second bearing surface 54. Thus, the end turn of the springs rests entirely against the associated seat, thereby limiting the wearing of the springs. These annular bearing surfaces develop in a plane parallel to the axis of rotation X.

The insert comprises a first upper lug 43 and a second upper lug 44 projecting circumferentially in two circumferentially opposite directions, the first upper lug 43 radially covering the second end of the first spring 11, and the second upper lug 44 covering the second end of the second spring 12.

The torque transmission device comprises a third spring 13 which is housed inside the first spring 11.

The torque transmission device also comprises a first shock absorber 61 positioned inside the third spring 13 and able elastically to oppose the relative rotation between the plate 1 and the phasing member 3 beyond a predetermined first angular travel between the plate 1 and the phasing member 3 in a first direction of relative rotation.

The torque transmission device further comprises a fourth spring 14 which is housed inside the second spring 12.

The torque transmission device also comprises a second shock absorber 62 positioned inside the fourth spring 14 and able elastically to oppose the relative rotation between the lateral washers 25 and 26 and the phasing member 3 beyond a second angular travel between the lateral washers 25 and 26 and the phasing member 3 in the first direction of relative rotation.

Each shock absorber 61, 62 is column-shaped and is made of thermoplastic, for example of co-polyester, for example formed from a material such as hytrel®.

As may be seen from FIG. 6, the first seat 21 is designed to press against the third spring 13 and the second seat 22 is designed to press against the fourth spring 14.

Here, the first spring and/or the second spring are mounted with a preload such that their length is reduced by less than less than 1 mm, with respect to their free length.

The first and second seats also each comprise a centering stud (92) for centering the first (11) and second (12) springs.

Figure 8:
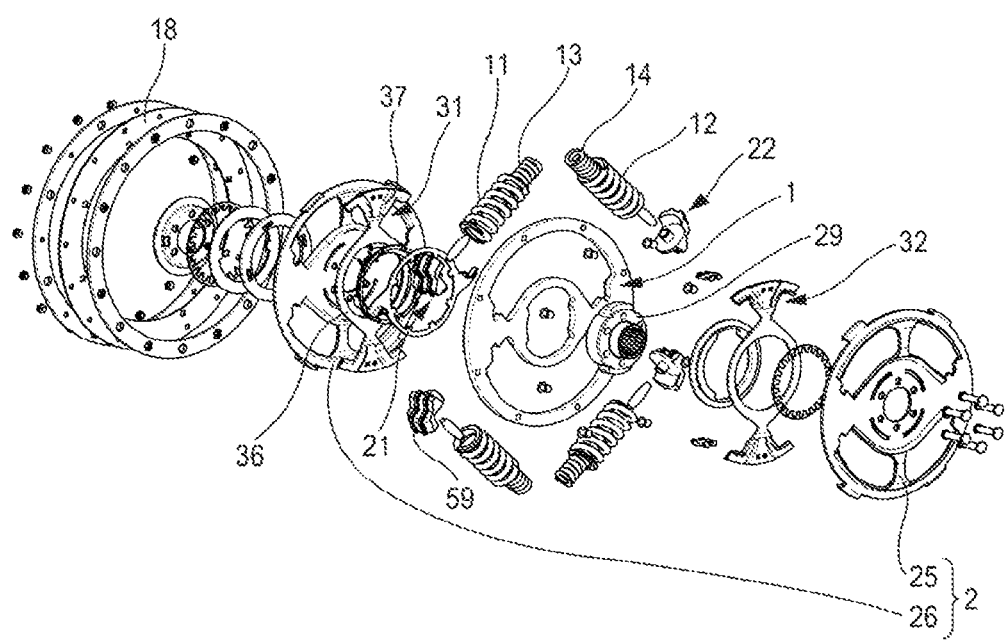
FIG. 8 is an exploded view of a second embodiment.

FIG. 8 gives an exploded view of a second embodiment, in which the phasing member has no insert, each torque transfer element 33 being formed directly by two tabs 37 each formed on a distinct phase washer 31, 32, the two tabs 37 being arranged axially facing one another.

The phasing member 3 therefore comprises, for each spring pair, two torque transfer elements 33 transferring the torque directly between the first spring 11 and the second spring 12 of a same spring pair.

The first and second springs 11 and 12 bear against the circumferentially opposite edge faces of the tabs 37 of the phase washers 31 and 32.

A flat spacer connects the two tabs 37. Each of the ends is crimped into a tab 37.

The tabs 37 of the phase washers 31 and 32 are stamped. Each tab 37 comprises a relief directed in a direction away from the other phase washer. The space 39 is mounted on this relief.

Figure 9:
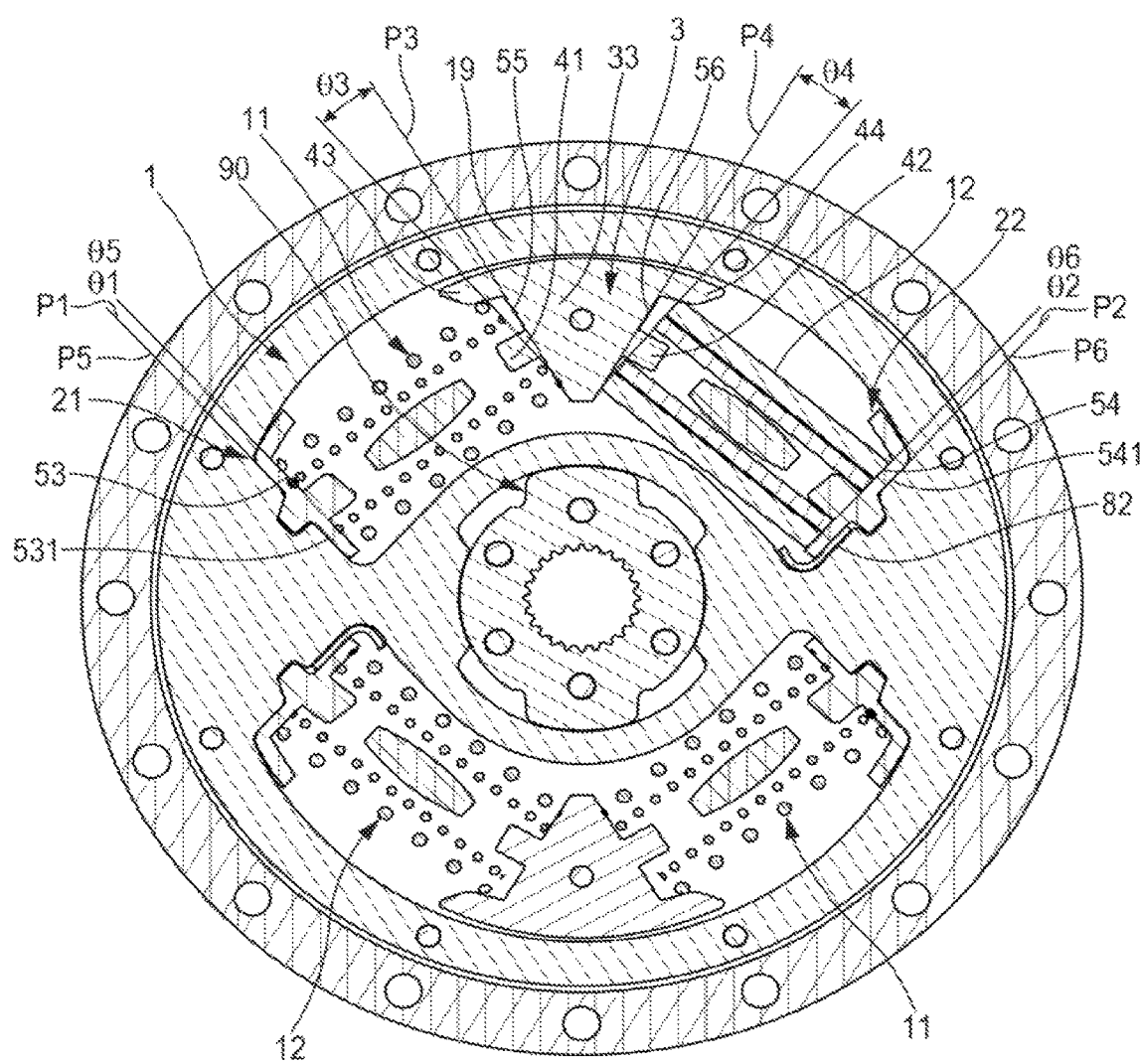
FIG. 9 is a view in section on a plane perpendicular to the axis of rotation of a third embodiment.

FIG. 9 depicts another embodiment in which the various components mentioned hereinabove are identical.

It may be seen from FIG. 9 that the torque transmission device comprises two first supporting seats 21 each positioned at a first end of a first spring 11 and two second supporting seats 21 each positioned at a first end of a second spring 12.

The torque transmission device comprises:
a first element 1 which is able to rotate about an axis of rotation X;
a second element 2 which is able to rotate about the axis of rotation X;
a third element 3 which is able to rotate about the axis of rotation X;
a first spring 11 which is compressed between the second element 2 and the third element 3 in a first direction S1 of relative rotation of the first element 1 and second element 2 and which is compressed between the first element 1 and the third element 3 in a second direction S2 of relative rotation of the first element 1 and second element 2 which is the opposite to the first direction of relative rotation,
the first spring 11 having, when the damper is in the position of rest, a first end face 111 on the one hand bearing directly or indirectly against a first contact surface 531 associated with the first element 1 and, on the other hand, bearing directly or indirectly against a fifth contact surface 532 associated with the second element 2, the first spring 11 also having a second end face 112 bearing directly or indirectly against a third contact surface 55 associated with the third element 3,
a second spring 12 which is compressed between the third element 3 and the first element 1 in the first direction of relative rotation of the first element 1 and second element 2 and which is compressed between the third element 3 and the second element 2 in the second direction of relative rotation of the first element 1 and second element 2,
the second spring 12 having a first end face 121 on the one hand bearing directly or indirectly against a second contact surface 541 associated with the first element 1 and, on the other hand, bearing directly or indirectly against a sixth contact surface 542 associated with the second element 2, the second spring 12 also having a second end face 122 bearing directly or indirectly against a fourth contact surface 56 associated with the third element 3, the first spring 11 and the second spring 12 being arranged in series between the first element 1 and the second element 2 by way of the third element 3.

The torque transfer element 33 bears circumferentially against a second end of the first spring 11 and also bears circumferentially against a second end of the second spring 12. It develops radially from the annular portions 36 of the phase washers 31, 32. Here, the torque transfer element transfers torque directly between the first spring 11 and the second spring 12. In other words, the torque transmission device has no supporting seat attached, on the one hand, between the torque transfer element 33 of the third element 3 and the first spring and, on the other hand, between the torque transfer element of the third element and the second spring.

FIG. 9 illustrates the torque transmission device in a position of rest. The first contact surface 531, the second contact surface 541, the third contact surface 55, the fourth contact surface 56, the fifth contact surface (not visible), and the six contact surface (not visible) respectively have a first bearing plane P1, a second bearing plane P2, a third bearing plane P3, a fourth bearing plane P4, a fifth bearing plane P5 and a sixth bearing plane P6 against which planes the springs 11, 12 can be firmly pressed during relative rotation or in the relative position signifying the end of angular travel of the first and second elements 1, 2.

As may be seen in FIG. 9, in a plane perpendicular to the axis of rotation X passing through the plate 1, and in the relative position of rest of the first and second elements, there is a second angular clearance $\theta 2$ separating the first end face 121 of the second spring 12 and the second bearing plane P2, a third angular clearance $\theta 3$ separating the second end face 112 of the first spring 11 and the third bearing plane P3, a fourth angular clearance $\theta 4$ separating the second end face 122 of the second spring 12 and the fourth bearing plane P4, and a fifth angular clearance $\theta 5$ separating the first end face 111 of the first spring 11 and the first bearing plane P1.

There are also, even though these are not visible in the section view of FIG. 9, the fifth and sixth contact surfaces 532 and 542 of the second element 2, with a first angular clearance $\theta 1$ separating the first end face 111 of the first spring 11 and the fifth bearing plane P5 of the fifth contact surface 532, and a sixth angular clearance 86 separating the first end face 121 of the second spring 12 and the sixth bearing plane P6 of the sixth contact surface 542.

For correct operation of the torque transmission device in the first direction S1 of relative rotation of the first and second elements, the first angular clearance $\theta 1$, the second angular clearance $\theta 2$, the third angular clearance $\theta 3$ and the fourth angular clearance $\theta 4$ are such that $\theta 3 > 2 \times \theta 1$ and $\theta 4 > 2 \times \theta 2$. Here, the third angular clearance $\theta 3$ and the fourth angular clearance θ4 are approximately 8 degrees and the first angular clearance θ1 and the second angular clearance θ2 are nil. The attack angular clearance is therefore concentrated exclusively on the phasing member, thereby ensuring extremely good operation with little wearing of the damper.

In other words, when the first element 1, the second element 2 and the third element 3 are in the relative position of rest, the first end face 111 of the first spring 11 is pressed against the first bearing plane P1 and the first end face of the second spring 12 is pressed against the second bearing plane P2.

Thus the attack of the springs is concentrated on either side of the phasing member, making it possible to limit the phenomena of wear.

Likewise, a fifth angular clearance θ5 separates the first end face 111 of the first spring 11 and the first bearing plane P1, and a sixth angular clearance θ6 separates the first end face 121 of the second spring 12 and the sixth bearing plane P6.

For correct operation of the torque transmission device in the second direction S2 of relative rotation, which is the opposite of S1, it is also the case that, in the relative position of rest: θ3>2×θ5 and θ4>2×θ6. Here, the fifth angular clearance θ5 and the sixth angular clearance θ6 are nil.

In other words, when the end faces of the springs bear against the first bearing plane P1, the second bearing plane P2, the third bearing plane P3, the fourth bearing plane P4, the fifth bearing plane P5 and the sixth bearing plane P6, that means that the attack angular clearance separating the end faces from their corresponding bearing plane has been taken up.

In this embodiment, θ1 is therefore substantially equal to θ5. Likewise, θ2 is substantially equal to θ6.

In this embodiment, whatever the angular travel between the first element and the second element, the first angular clearance θ1 and the second angular clearance θ2 are nil. Here, whatever the angular travel between the first element and the second element, the first end face 111 of the first spring 11 is pressed against the first bearing plane P1 and the first end face of the second spring 12 is pressed against the second bearing plane P2.

It may be seen from FIG. 9 that the second end face 112 of the first spring 11 is in contact with the third contact surface 55 by way of a radially internal portion of the first spring 11 when the first element 1, the second element 2 and the third element 3 are in the relative position of rest, and the second end face of the first spring is kept in contact with the fourth contact surface 56 by way of a radially internal portion when the first element 1, the second element 2 and the third element 3 are in the relative position of rest. The third and fourth angular clearances can be measured on these contacts.

As can be seen in the section view in FIG. 9, the insert 33 is arranged on the same plane perpendicular to the axis of rotation X as the plate.

The first supporting seat 21 and the second supporting seat 22 have a cap 51 respectively radially covering the first end of the first spring 11 and the first end of the second spring 12, the caps of the first seat 21 and of the second seat 22 each having axial-guidance ribs able to collaborate with the plate 1 and with the lateral washers 25 and 26.

With reference to FIG. 9, it may be seen that the first seat 21 comprises a frontal face 53 against which a first end face 111 of the first spring 11 bears. In a plane perpendicular to the axis of rotation X and in the neutral state of torque, it may be seen that the first end face 111 of the first spring 11 is pressed firmly against the frontal face 53 of the first seat 21 which is itself pressed firmly against the first 531 and fifth 532 contact surfaces. The first angular clearance θ1 and the fifth angular clearance θ5 are therefore nil.

It may also be seen that the second seat 22 comprises a frontal face 54 against which a first end face 121 of the second spring 12 bears. In a plane perpendicular to the axis of rotation X and in the neutral state of torque, it may be seen that the first the first end face 121 of the second spring 12 is pressed firmly against the frontal face 54 of the second seat 22 which is itself pressed firmly against the second 541 and sixth 542 contact surfaces. The second angular clearance θ2 and the sixth angular clearance θ6 are therefore nil.

The frontal faces 53 and 54 are annular surfaces, the first end face 111 of the first spring 11 and the first end face 121 of the second spring 12 being formed respectively by a first end turn of the first spring 11 and a first end turn of the second spring 12 each of which respectively rests on the frontal face 53 and on the frontal face 54. Thus, the end turn of the springs rests entirely against the associated seat, thereby limiting the wearing of the springs. These annular bearing surfaces develop in a plane parallel to the axis of rotation X.

The two circumferentially opposite edge faces of the insert 33 form the third contact surface 55 and the fourth contact surface 56. The thickness E of this body is less than the axial width L occupied by the first and second springs.

As may be seen from FIG. 9, the first seat 21 is designed to press against the third spring 13 and the second seat 22 is designed to press against the fourth spring 14.

Here, the first spring and/or the second spring are mounted with a preload such that their length is reduced by less than less than 1 mm, with respect to their free length.

Figure 10:
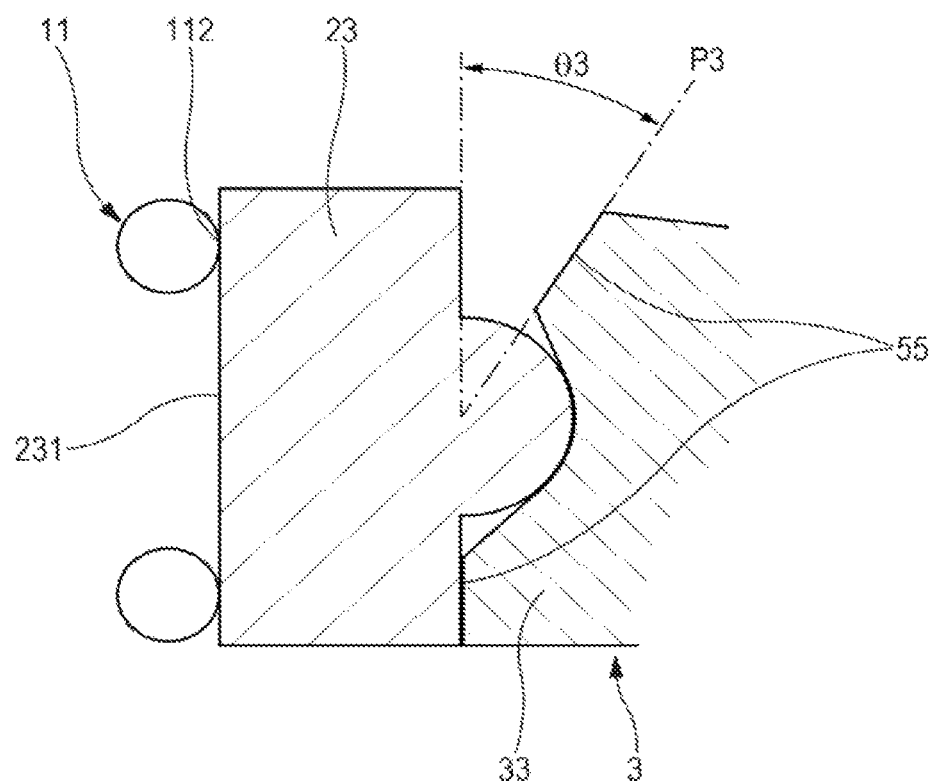
FIG. 10 schematically depicts a view of a detail of the third embodiment.

FIG. 10 schematically depicts a view of the detail of a second embodiment in which the second end face 112 of the first spring 11 bears against a frontal face 231 of a third supporting seat 23 and the second end 122 of the second spring 12 bears against a frontal face of a fourth supporting seat, the third supporting seat and the fourth supporting seat each being mounted with the ability to pivot on the third element 3 with an angle of pivoting between the position of rest and the relative position representing the end of the travel, the third angular clearance and the fourth angular clearance being embodied respectively by the angle of pivoting of the third seat and the angle of pivoting of the fourth seat.

Here, only the third seat 23 is depicted. The second end face 112 of the spring 11 is pressed firmly against the front face 231 of the third supporting seat 23. As a result, the third angular clearance θ3 corresponds here to the angle of pivoting of the third seat 23 with respect to the torque transfer element 33 of the phasing member 3. The pivoting of the seat is achieved by means of a convex boss formed on the seat and collaborating with a cavity formed in the torque transfer element 33. The angle of pivoting can easily be adjusted by modifying the inclination of the walls.

The invention claimed is:

1. A torque transmission device comprising:
a first element which is able to rotate about an axis of rotation;
a second element which is able to rotate about the axis of rotation;
a third element which is able to rotate about the axis of rotation;
a first spring which is arranged between the first element and the third element so as to be compressed elastically upon relative rotation between the first element and the third element, a second spring which is arranged between the second element and the third element so as to be compressed elastically upon relative rotation between the second element and the third element, the first spring and the second spring being arranged in series between the first element and the second element by way of a torque transfer element of the third element, a first supporting seat positioned at a first end of the first spring between the first element and the first spring so as to transfer torque between the first element and the first spring in a first direction of relative rotation of the first element and second element, and between the second element and the first spring so as to transfer torque between the second element and the first spring in a second direction of relative rotation of the first element and second element, a second supporting seat positioned at a first end of the second spring between the second element and the second spring so as to transfer torque between the second element and the second spring in the first direction of relative rotation of the first element and second element, and between the first element and the second spring so as to transfer torque between the first element and the second spring in the second direction of relative rotation of the first element and second element, wherein the third element comprises the torque transfer element directly transferring torque between the first spring and the second spring, wherein the torque transmission device further comprises
a plurality of first springs and a plurality of second springs organized in spring pairs, the third element being a phasing member comprising a plurality of torque transfer elements, each torque transfer element being interposed between the first spring and the second spring of a spring pair, the first spring and the second spring of each spring pair being arranged in series by way of a torque transfer element, and the phasing member comprising at least one phase washer provided with an annular portion extending about the axis of rotation, and
a plurality of first supporting seats each positioned at a first end of a first spring and a plurality of second supporting seats each positioned at a first end of a second spring, and wherein each phase washer comprises a tab extending radially from the annular portion and arranged circumferentially between the first spring and the second spring and each torque transfer element is formed by an insert mounted on at least one of the tabs of a phase washer, each insert being made of steel, each insert being clamped axially between a tab of one phase washer and a tab of another phase washer, the insert being assembled with the two tabs of phase washer between which the insert is fitted by means of a fastener.

2. The torque transmission device as claimed in claim 1, wherein the first spring and the second spring are helical springs made of steel and the torque transfer element is made of metal.

3. The torque transmission device as claimed in claim 2, wherein the torque transfer element is made of steel.

4. The torque transmission device as claimed in claim 1, wherein each phase washer is formed from steel sheet.

5. The torque transmission device as claimed in claim 1, wherein each annular portion extends about the axis of rotation radially on an inside of the first and second springs.

6. The torque transmission device as claimed in claim 1, wherein the first element comprises a plate extending around the axis of rotation,
wherein the second element comprises two lateral washers arranged one on each side of the plate, and
wherein the third element comprises two phase washers axially offset from one another, the two phase washers being arranged axially on an inside of the two lateral washers of the second element, and the two phase washers being arranged axially one on each side of the plate.

7. The torque transmission device as claimed in claim 1, wherein the torque transfer element comprises
a first centering device positioned in the second end of the first spring, and
a second centering device positioned in the second end of the second spring, there being an axial clearance between the first centering device and the first spring, and there being an axial clearance between the second centering device and the second spring, each axial clearance being less than 1 mm.

8. The torque transmission device as claimed in claim 7, wherein each axial clearance is less than 0.5 mm.

9. The torque transmission device as claimed in claim 1, wherein the first and second seats are produced in plastic.

10. The torque transmission device as claimed in claim 9, wherein the first and second seats are produced in polyamide or PAEK.

11. The torque transmission device as claimed in claim 1, wherein the first seat and the second seat have a cap respectively radially covering the first end of the first spring and the first end of the second spring, and
wherein the caps of the first seat and of the second seat each have axial-guidance ribs able to collaborate with the first element and with the second element.

12. The torque transmission device as claimed in claim 1, wherein the torque transmission device further comprises
a third spring which is housed inside the first spring and/or a first shock absorber positioned inside the first spring and able elastically to oppose the relative rotation between the first element and the third element beyond a predetermined first angular travel between the first element and the third element in the first direction of relative rotation; and
a fourth spring which is housed inside the second spring and/or a second shock absorber positioned inside the second spring and able elastically to oppose the relative rotation between the second element and the third element beyond a predetermined second angular travel between the second element and the third element in the first direction of relative rotation.

13. The torque transmission device as claimed in claim 1, wherein the first spring and/or the second spring are mounted with a preload such that their length is reduced by less than 2 mm with respect to their free length.

14. The torque transmission device as claimed in claim 13, wherein the first spring and/or the second spring are mounted with a preload such that their length is reduced by less than 1 mm with respect to their free length.

15. The torque transmission device as claimed in claim 1, wherein one of the first element and the second element bears a friction disk, and the other of the first element and the second element comprises a hub able to drive a gearbox input shaft.

16. A torque transmission system comprising:
a torque transmission device as claimed in claim 14; and a torque limiter configured to squeeze the friction disk of the torque transmission device.

17. The torque transmission device as claimed in claim 1, wherein the fastener is a rivet.

18. The torque transmission device as claimed in claim 1, wherein each insert is made of sintered or cast steel.

19. A torque transmission device comprising:
a first element which is able to rotate about an axis of rotation;
a second element which is able to rotate about the axis of rotation;
a third element which is able to rotate about the axis of rotation;
a first spring which is arranged between the first element and the third element so as to be compressed elastically upon relative rotation between the first element and the third element,
a second spring which is arranged between the second element and the third element so as to be compressed elastically upon relative rotation between the second element and the third element, the first spring and the second spring being arranged in series between the first element and the second element by way of a torque transfer element of the third element,
a first supporting seat positioned at a first end of the first spring between the first element and the first spring so as to transfer torque between the first element and the first spring in a first direction of relative rotation of the first element and second element, and between the second element and the first spring so as to transfer torque between the second element and the first spring in a second direction of relative rotation of the first element and second element,
a second supporting seat positioned at a first end of the second spring between the second element and the second spring so as to transfer torque between the second element and the second spring in the first direction of relative rotation of the first element and second element, and between the first element and the second spring so as to transfer torque between the first element and the second spring in the second direction of relative rotation of the first element and second element, and
wherein the third element comprises the torque transfer element directly transferring torque between the first spring and the second spring,
wherein the torque transmission device further comprises
a plurality of first springs and a plurality of second springs organized in spring pairs, the third element being a phasing member comprising a plurality of torque transfer elements, each torque transfer element being interposed between the first spring and the second spring of a spring pair, the first spring and the second spring of each spring pair being arranged in series by way of a torque transfer element, and the phasing member comprising at least one phase washer provided with an annular portion extending about the axis of rotation, and
a plurality of first supporting seats each positioned at a first end of a first spring and a plurality of second supporting seats each positioned at a first end of a second spring,
wherein said at least one phase washer comprises a tab extending radially from the annular portion and arranged circumferentially between the first spring and the second spring, the torque transfer element being formed by said tab, and
wherein the first element comprises a plate extending around the axis of rotation and the second element comprises two lateral washers arranged one on each side of the plate, the third element comprising two phase washers axially offset from one another, the two phase washers being arranged axially inside of the two lateral washers of the second element, and the two phase washers being arranged axially one on each side of the plate.

* * * * *